US012560919B2

(12) United States Patent
Knicker et al.

(10) Patent No.: US 12,560,919 B2
(45) Date of Patent: Feb. 24, 2026

(54) METHOD OF DETERMINING AT LEAST ONE TOLERANCE BAND LIMIT VALUE FOR A TECHNICAL VARIABLE UNDER TEST AND CORRESPONDING CALCULATION DEVICE

(71) Applicant: Sanofi, Paris (FR)

(72) Inventors: Florian Knicker, Frankfurt am Main (DE); Patric Ralph Stracke, Frankfurt am Main (DE); Christian Weckbacher, Frankfurt am Main (DE); Christian Reuss, Frankfurt am Main (DE)

(73) Assignee: SANOFI, Paris (FR)

( * ) Notice: Subject to any disclaimer, the term of this patent is extended or adjusted under 35 U.S.C. 154(b) by 749 days.

(21) Appl. No.: 17/782,689

(22) PCT Filed: Nov. 30, 2020

(86) PCT No.: PCT/EP2020/083902
§ 371 (c)(1),
(2) Date: Jun. 6, 2022

(87) PCT Pub. No.: WO2021/115818
PCT Pub. Date: Jun. 17, 2021

(65) Prior Publication Data
US 2023/0043354 A1 Feb. 9, 2023

(30) Foreign Application Priority Data

Dec. 11, 2019 (EP) .................................... 19306629

(51) Int. Cl.
G05B 19/418 (2006.01)
(52) U.S. Cl.
CPC .................. *G05B 19/41875* (2013.01); *G05B 2219/32191* (2013.01)

(58) Field of Classification Search
None
See application file for complete search history.

(56) References Cited

U.S. PATENT DOCUMENTS

| | | | |
|---|---|---|---|
| 2012/0095803 A1 | 4/2012 | Tsuru | |
| 2017/0024502 A1 | 1/2017 | Jallepalli et al. | |
| (Continued) | | | |

FOREIGN PATENT DOCUMENTS

| | | |
|---|---|---|
| WO | 2010137488 A1 | 12/2010 |
| WO | 2016152204 A1 | 9/2016 |
| WO | 2017119221 A1 | 7/2017 |

OTHER PUBLICATIONS

International Preliminary Report on Patentability in International Appln. No. PCT/EP2020/083902, mailed on Jun. 23, 2022, 10 pages.

(Continued)

*Primary Examiner* — Raymond L Nimox
(74) *Attorney, Agent, or Firm* — Bond, Schoeneck & King, PLLC

(57) ABSTRACT

Disclosed is a method of determining at least one tolerance band limit value for a technical variable under test. The method includes obtaining the at least one tolerance band limit value from sample tolerance band limit values of different samples, wherein the samples comprise values of the technical variable under test of the associated sample, wherein obtaining the at least one tolerance band limit value comprises using a location measure of a distribution according to which the sample tolerance band limit values are distributed, wherein the technical variable under test is distributed according to an underlying extreme value distribution function, wherein each of the sample tolerance band limit values is calculable using a sample-specific conditional probability distribution function which is a function of sample values of the sample, and wherein the technical (Continued)

100

110   106   108
112   D   101   104   102   P variable relates to a physical characteristic of a product that is producible in an industrial mass production process.

15 Claims, 4 Drawing Sheets

(56) References Cited

U.S. PATENT DOCUMENTS

2018/0003594 A1* 1/2018 Matsuno ................. G07C 3/14
2020/0334921 A1* 10/2020 Spes ....................... G06F 17/18

OTHER PUBLICATIONS

International Search Report and Written Opinion in International Appln. No. PCT/EP2020/083902, mailed on Feb. 12, 2021, 11 pages.

Kiermeier, "Visualising and Assessing Acceptance Sampling Plans: The R Package Acceptance Sampling," Journal of Statistical Software, Jul. 2008, 26(i06), 20 pages.
Lawless, "Confidence interval estimation for the parameters of the Weibull distribution," Utilitas Mathematica, 1972, 2:71-87.
Lawless, "Construction of tolerance bounds for the extreme-value and the Weibull distribution," Technometrics, May 1975, 17(2):255-261.
Lawless, "On the estimation of safe life when the underlying life distribution is Weibull," Technometrics, Nov. 1973, 15(4):857-865.
Minitab.com [online], "Methods and formulas for the tolerance intervals in Tolerance Intervals (Nonnormal Distribution)," available no later than Dec. 11, 2019, retrieved on Aug. 1, 2022, retrieved from URL<https://support.minitab.com/en-us/minitab/18/help-and-how-to/quality-and-process-improvement/quality-tools/how-to/tolerance-intervals-nonnormal-distribution/methods-and-formulas/tolerance-intervals/>, 10 pages.
Notice of Reasons for Refusal, JP Patent Application No. 2022-535483, dated Dec. 3, 2024, pp. 1-8 (with pp. 1-4 being a translation).

* cited by examiner

400

410

Histogram for k values of Gumbel (alpha=0.05,pc=0.99,n=100)

Empirical and theoret. dens.

Q-Q Plot

Empirical and theoret. CDFs

P-P Plot

METHOD OF DETERMINING AT LEAST ONE TOLERANCE BAND LIMIT VALUE FOR A TECHNICAL VARIABLE UNDER TEST AND CORRESPONDING CALCULATION DEVICE

CROSS REFERENCE TO RELATED APPLICATIONS

The present application is the national stage entry of International Patent Application No. PCT/EP2020/083902, filed on Nov. 30, 2020, and claims priority to Application No. EP 19306629.7, filed on Dec. 11, 2019, the disclosures of which are incorporated herein by reference.

TECHNICAL FIELD

The disclosure relates to a method of determining a tolerance band limit value for a technical variable under test and to a corresponding calculation device.

The tolerance band limit value may be named as k-factor and may be used within a sampling plan which is used in the production of a product to monitor a variable under test. The tolerance band limit value is a tolerance band limit factor if it is used in a product in which at least two factors are multiplied with each other. Furthermore, a value of a sample size may be mentioned in the sampling plan. The sample size may determine the number of samples that have to be taken from a lot in order to check whether the lot/batch is allowed to be released for further use or not. Sampling size and k factor may be closely related.

The usage of a sampling plan may be necessary and obligatory in a regulated environment, for instance during the production of medical instruments or medical devices in order to minimize jeopardizing of health and/or life of patients, i.e. human beings or animals.

There are already many standards for variables under test that are distributed according to the normal distribution, i.e. Gaussian distribution, see for instance:

ISO (International Standardization Organization) 2859-1 (Sampling procedures for inspection by attributes—Part 1: Sampling schemes indexed by acceptance quality limit (AQL) for lot-by-lot inspection), and/or ISO 3951-1 (Sampling procedures for inspection by variables—Part 1: Specification for single sampling plans indexed by acceptance quality limit (AQL) for lot-by-lot inspection for a single quality characteristic and a single AQL).

Other standards that have to be fulfilled for instance for needle based injection systems are:

ISO 11608-1 (Needle-based injection systems for medical use—Requirements and test methods—Part 1: Needle-based injection systems), and/or ISO16269-6 (Statistical interpretation of data—Part 6: Determination of statistical tolerance intervals).

Both standards ISO 11608-1 and ISO16269-6 or at least one of these standards may be fulfilled if the disclosure is used that is explained below.

However, there are no standardized methods for the case in which the variable under test has a different distribution from the normal distribution, preferably for methods that use sampling of variables for acceptance sampling. Sampling of variables is different from attribute sampling that is based on rejection or acceptance of an item of a sample. Sampling of variables measures or determines the value of the variable under test in each item of the sample and uses this measurements in order to decide whether a lot is accepted or rejected. Examples for variables which are not distributed according to a Normal distribution are variables that are distributed according to the generalized extreme value distribution, Frechet distribution, Weibull distribution or Gumbel distribution. In medical injection devices, for instance single dose autoinjectors or multi dose injection pens, the following physical dimensions or parameters may have an extreme value distribution: dose dial torque in pens, cap removal force, breakage forces in general. In many cases it is not possible to transform methods that are valid for normal distribution to other distributions due to for instance other restrictions and or other presumptions. Extreme value distributions relate for instance to life times, to breakage values, etc. The value of interest is not the mean value but the extreme value of the variable under test. Thus, extreme value theory or extreme value analysis (EVA) deals with the extreme deviations from the median of probability distributions. It seeks to assess, for instance from a given ordered sample of a given random variable, the probability of events that are more extreme than any previously observed. Typical extreme value distributions are the generalized extreme value distribution (Fisher-Tippet distribution). For a shape parameter equal to zero a Gumbel distribution results. If the shape parameter is selected appropriately a Frechet distribution and a reversed Weibull distribution may be regarded as special cases of the generalized extreme value distribution.

It is an object of the disclosure to provide a method of determining a tolerance band limit value for a technical variable under test, preferably the method should allow to establish a sampling plan, e.g. to deliver pre-defined k factors and/or a corresponding value for the sample size. A corresponding computer program product and a calculation device for performing the methods should also be provided.

This object is solved by the method according to claim 1. Further embodiments are given in the dependent claims. Furthermore, the object is solved by a corresponding computer program product and a corresponding calculation device according to the further independent claims.

SUMMARY

A method of determining a tolerance band limit value for a technical variable under test, may comprise:

obtaining the at least one tolerance band limit value from sample tolerance band limit values of different or respective samples, wherein the samples comprise or consist of values of the technical variable under test of the associated or respective sample, wherein obtaining the at least one tolerance band limit value comprises using preferably a location measure of a distribution according to which the sample tolerance band limit values are distributed, wherein the technical variable under test is assumed to be distributed or is distributed according to an underlying extreme value distribution function, wherein each of the sample tolerance band limit values is calculated using preferably a sample-specific conditional probability distribution function which is a function of sample values of the respective sample, and wherein preferably the technical variable and/or the values of the technical variable under test relate to a physical characteristic of a product that is produced or that is producible in an industrial mass production process.

Further embodiments are mentioned in the independent claims.

EMBODIMENTS OF THE DISCLOSURE

A method of determining a tolerance band limit value for a technical variable (x) under test, may comprise:

obtaining the at least one tolerance band limit value from sample tolerance band limit values of different or respective samples, wherein the samples comprise or consist of values of the technical variable under test of the associated or respective sample, wherein obtaining the at least one tolerance band limit value comprises using preferably a location measure of a distribution according to which the sample tolerance band limit values are distributed, wherein the technical variable under test is assumed to be distributed or is distributed preferably according to an underlying extreme value distribution function, wherein each of the sample tolerance band limit values is calculated using preferably a sample-specific conditional probability distribution function which is a function of sample values of the respective sample, and wherein preferably the technical variable and/or the values of the technical variable under test relates to a physical characteristic of a product that is produced or that is producible in an industrial mass production process.

The disclosure is based on the consideration that one of a vast number of difficulties in determining the tolerance limit factor k for a sampling plan is the prerequisite that the k factor that is part of the sampling plan is not allowed to depend on the observed samples, i.e. the k factor has to be determined before the sample is taken out of the production process. The same applies to the value of the sample size. The obtaining step may be based on simulation of values for the variable under test and may therefore enable to establish pre-defined sampling plans.

The mass production may be a production that produces, for instance more than one hundred thousand pieces per year, more than 1 million pieces per year, more than 10 million pieces a year or more than 100 million pieces a year. For instance, less than 10 billion or less than 1 billion (i.e. less than 1000 million) products a year may be produced. The production may be a production of medical products, e.g. technical medical products (devices) or pharmaceutical medical products. Products of other industries may be also used in the method, for instance automotive products, semiconductor products, etc.

For all sample tolerance band limit values the same function sample-specific conditional probability distribution function may be used which is a function of the sample values of the respective sample, see formula (F4) and/or (F11) which are given below. The same sample-specific conditional probability distribution function may be used for different types of sample tolerance band limit values, e.g. for k factors considering the producer(s) risk, i.e. $k_p$ and for k-factors considering the consumer risk, i.e. $k_c$. However, the confidence level and/or other parameters for calculating functional values of the sample-specific conditional probability distribution may be selected depending on the type of k-factor that has to be calculated. The term "sample-specific" relates here to a condition that may be expressed using the "pipe" symbol "|" that is known from basic statistics. In probability theory, conditional probability is a measure of the probability of an event occurring given that another event has (by assumption, presumption, assertion or evidence) occurred. Here, the sample-specific conditional probability distribution is a probability distribution occurring given that the specific sample has occurred.

The lot or a batch may contain a predefined amount of parts that are transported through and that are processed in the production as a group of parts or products. The lot/batch may contain a number of items that is in the range of 10 to 1000000 parts. For technical medical products (devices) the number of items may be in the range of 100 to 100000 parts, for instance 10000 parts. Other industries may have other lot sizes, for instance between 10 to 100 semiconductor wafers in semiconductor industry. Machines that are used for the production, especially for the production of medical devices may be molding machines, preferably injection molding machines that produce plastic parts.

The sample tolerance band limit values may be distributed according to a normal distribution or to another distribution, preferably to a distribution that is not an extreme value distribution itself.

The location measure of a distribution according to which the sample tolerance band limit values are distributed may be the mean value or the modus or the median or another appropriate location measure. The mean value may be named also as "arithmetic mean" or as "average", i.e. it is calculated as the sum of values which is divided by the number of the values.

The product may be part of a product or a complete product. A part of product may be a subassembly, for instance a front part of a case of a medical device, e.g. of an autoinjector or of a multi dose pen, and/or a carrier for a container or comprising a container (e.g. cartridge or syringe) for a medicament and/or a rear part of a case for an autoinjector or a multi dose pen.

In more detail the method may comprise:

a) optionally defining an underlying probability distribution function for a variable under test that is a technical characteristic of products of a lot that has to be produced in an industrial production process, b) optionally defining based on the underlying distribution function a preferably sample-specific conditional probability distribution function, wherein the sample-specific conditional probability distribution function allows to calculate at least one tolerance limit based on determined values of the variable under test of a sample, and wherein the sample-specific conditional probability distribution function is conditional in the sense that the function values of the sample-specific conditional probability distribution function depend on the determined values of the sample, c) generating, preferably simulating, at least 10, at least 100 or at least 1000 samples of preferably the same sample size using the underlying probability distribution function and using parameters that are characteristic for the industrial production process as well as preferably using a random function in order to consider the fluctuations of the industrial production process, d) calculating a respective sample tolerance band limit value for each of the group of samples using the sample specific conditional probability distribution function, e) calculating a location measure of a distribution that is represented by the tolerance band limit values, f) optionally using the location measure as a tolerance band limit value preferably for defining a sampling plan that is used or that is usable in the industrial production of a lot of the products or using the location measure to calculate an improved tolerance band limit value, preferably for such a sampling plan.

A simulation in step c) enables to establish pre-defined sampling plans. However, in step c) it is also possible to use production data instead of simulated data. However, this may not be economically. Both cases are possible because the conditional probability distribution function is valid for determined (measured) data as well as for simulated data.

The random function that is used for the simulation may be a random function or a pseudo random function that may be realized easier compared to a random function using a computer.

Furthermore, the sampling plan may be used in the production of the products in order to decide whether to accept a lot or to reject a lot. This decision may be made automatically, e.g. by a machine, preferably by a computing machine or by a computer. Alternatively and/or additionally, humans may be involved in the decision.

"Determine" may comprise measurement, i.e. a matching to SI (system international) units for instance, or it may not comprise such a matching.

The number of samples that are mentioned in step c) and that corresponds to the number of sample tolerance band limit values may be for instance less than 100.000 or less than 10.000. The number of samples may also be smaller than 10 but may be at least 2 samples. The number of values that a sample comprises or consists of may be in the range of 10 to 1000, preferably in the range of 30 to 300.

The method may further comprise:

testing whether a chosen sample size of the samples is great enough using the location measure of the tolerance band limit values, and if the chosen sample size is not great enough increasing the chosen sample size and generating new samples that have the increased sample size and performing the obtaining step again, and if the chosen sample size is great enough using the chosen sample size for defining the sampling plan or using the chosen sample size to calculate an improved value of sample size for this sampling plan.

The testing may be performed by comparing two types of tolerance band limit values that have been obtained by the method that is mentioned above. If a tolerance band limit value $k_c$ that considers the customers risk is smaller than a tolerance band limit value $k_p$ that considers the producer(s) risk the chosen sample size may be great enough, preferably great enough to make sure that no contradictions occur during the calculation of tolerance band intervals or tolerance band limits/bounds based on both types of tolerance band limit values ($k_p$ and $k_c$). An alternative condition for testing is whether the $k_c$ factor is smaller than or equal to the $k_r$-factor. Similar tests are possible as well, e.g. test if $k_p$ is greater than $k_c$ and taking the corresponding action.

Thus, the at least one tolerance band limit value may be a tolerance band limit value $k_p$ that considers the risks of at least one producer of the products. Alternatively the at least one tolerance band limit value is a tolerance band limit value $k_c$ that considers the risks of the consumers of the products. According to a further alternative, at least two or exactly two tolerance band limit factors may be obtained, e.g. the tolerance band limit value $k_p$ and the tolerance band limit value $k_c$. "consider" may mean "is based on". The same may be valid for the tolerance band limit values that are used to obtain the at least one tolerance band limit value, i.e. considering of producer risk or consumer risk respectively.

A first tolerance band limit value may be used that considers the risks of the producer of the products and a second tolerance band limit value may be used that considers the risks of the consumers of the products. A first generating step c) that is mentioned above may be performed for obtaining the first tolerance band limit value. A second generating step c) may be performed for obtaining the second tolerance band limit value. This may improve the precision of the obtained k-factors.

Alternatively, only one generating step c) may be performed for the calculation of the first tolerance band limit values and for the calculation of the second tolerance band limit values in order to save calculation time.

The method may further comprise:

calculating a first location measure for a first distribution that is represented by first sample tolerance band limit values which consider the risk of producer(s), and calculating a second location measure for a second distribution that is represented by second sample tolerance band limit values which consider the risk of costumers.

Both of these distributions may be for instance normal distribution and the location measure may be a first mean value and a second mean value.

The method may further comprise:

testing whether the second location measure is smaller than alternatively smaller than or equal the first location measure, and if the second location measure is not smaller than the first location measure increasing the chosen sample size and generating new samples, see step c) above, that have the increased sample size and performing the obtaining step again, preferably also steps, d), e) of the detailed method that is given above, and if the second location measure is smaller than the first location measure using the chosen sample size for defining a sampling plan or using the chosen sample size to improve the calculation of value of the sample size for such a sampling plan.

It is also possible to use similar tests, e.g. test if the first location measure is greater and taking the corresponding actions. A simple but efficient method is realized by these steps. The value by which the value of the sample size is increased may be determined empirically.

The products may be medical products, especially medical devices or pharmaceutical products. The variable under test may be a dial torque, a cap removal force, a cap placement force or a breakage force, preferably of an injection device that is used to inject a medicament. Example for medicaments or drugs that may be injected are given below. The health care sector or industry has a direct influence to the health and/or life of people. Therefore, it is important to enable the consideration and/or balancing of producer(s) risks and consumer risks also in cases where a variable under test is not distributed according to a normal distribution but for instance according to an extreme value distribution. Regulatory authorities have to confirm to corresponding sampling plans before a medical product is admitted for market use. Regulatory authorities may also take care that the sampling plans are observed during the production of medical devices. The current disclosure makes it possible to establish a sampling plan in a very transparent way if the underlying distribution is an extreme value distribution and/or if sampling by variables is used for acceptance sampling. It may be for instance important, that a cap removal force is not greater than a specified value in order to enable also a weak person the removal of the cap from an injection device.

There may be further candidates for variables under tests that have an underlying extreme value distribution, for instance a Gumbel distribution. In principle every feature that is a maximum or a minimum of at least one independent and identical distributed (iid) variable may be the variable under test.

An autoinjector (AI) may be an injection device that is operated by patients or other persons for instance by only removing the cap and starting an injection. Thus, no does dial may be necessary and the injection may be an automatic injection. A spring member that generates the injection force may be loaded in the factory and not by a user of the autoinjector. A multi dose pen may be an injection device that is operated by the patient or by another person whereby the patient or the person has to perform more steps compared to the operation of an autoinjector. Thus the patient or the person (nurse, relative, etc.) may dial a dose before injection, the patient or other person may deliver a force for injection or for biasing a spring member that delivers injection force, a cap may be removed before injection, the cap may be placed on the pen again after use, i.e. after injection of the medicament.

The method may further comprise:

producing a lot of the products, preferably in a factory, taking a sample group of products out of the lot or from the lot wherein the size of the sample group is preferably determined by the sample size that is defined in the sampling plan, determining the values of the variable under test for each product of the sample group, comparing the determined values with a tolerance interval that is calculated using the obtained tolerance band limit value, and optionally deciding, for instance automatically, whether to accept the lot or to reject the lot based on the results of the comparison. However, humans may be involved in the decision in addition to or instead of an automatic decision process.

"Determining" may be determining with or without measuring. Measuring is the matching of detected or determined values to SI (System International) units or units according to other system of units, for instance system of imperial units (IU). Thus, determining may be done without comparison with units of SI system or of another standard.

An accepted lot may be processed further in the production or may be shipped to a customer or manufacturer that assembles parts to the final product or to a subassembly of a final product. A rejected lot may be thrown away or may be reworked. The manufacturing process may be adjusted based on data of products of a rejected lot. Thus, an essentially technical method is given that evaluates an industrial production process or that allows the evaluation of an industrial production process. The sampling plan may comprise the at least one obtained tolerance limit factor and/or a corresponding sample size.

The sample-specific conditional probability distribution function may be calculated according to the following formula:

$$G(x; z) = \tag{F4}$$

$$C_Z \int_0^{+\infty} \frac{r^{n-2} \exp\left((t-1) * \sum_{i=1}^{n} z_i\right) * IG_n\left[\exp\left(\lambda_p - xt\right) * \sum_{i=1}^{n} \exp\left(z_i t\right)\right]}{\left[\frac{1}{n}\sum_{i=1}^{n} \exp\left(z_i t\right)\right]^n} dt$$

wherein $C_z$ is a normalization constant, t is an integration variable, n is the number of observations in the sample, i.e. the sample size, exp is the exponential function, i is a counting variable, $z_i$ are the determined values (z) of the variable (x) under test, $IG_n$ is the function $$IG_n[y] = \int_0^y \frac{t^{n-2} * \exp(-t)}{\Gamma[n]} dt$$

with $\Gamma$ the Gamma function, and $\lambda_p$ is $\log(-\log(P))$ with P the probability content.

This formula is valid for several extreme value distribution functions. Modification that consider the valid or the specific extreme value distribution function are mentioned below. This formula is based on Lawless 1), 2) and 3), see details given below. However, Lawless and other sources use this formula (4) for different purposes than the present disclosure.

The method may further comprise:

performing the obtaining step in a first phase with a calculation having a first precision, and performing the obtaining step in a second phase with a calculation having a second precision that is higher than the first precision.

Two phases of calculation may preferably also be performed for steps c) and/or d) and/or e) of the detailed method that is given above especially for both tolerance band limit values (considering producer risk, considering costumer risk). The second precision may by greater at least by factor 2, 3 or 4 compared to the first precision. The usage of two different phases allow to save plenty of calculation time and/or calculation steps. A comparably coarse calculation may be used to find appropriate start values for the second phase. The second phase may allow to calculate the tolerance band limit values or factors with a precision that is necessary for regulatory purposes. The overall calculation time may nevertheless be longer than several days, for instance more than 5 days using a modern workstation in 2019.

The method may be performed for uncensored data. However, for a Weibull distribution type II censored data may be used. A set number of subjects or items may be in a lot and where the examination of the sampled items may stop when a predetermined number of the observed items have failed; the remaining subjects are then right censored. Type II censored data, type I censored data or random censored data may also be used, preferably independent of the underlying distribution function according to which the values of the variable under test are distributed. Censoring may allow to save time and costs during the evaluation of a production.

The method may also performed for truncated data. Truncated data is data that is distributed according to a distribution function is truncated, for instance if negative values are not possible or a range of positive values is not possible. The truncation may be considered for the calculation of the tolerance band limit factors. Formula (F4) or other appropriate formulas that may be used as sample-specific conditional probability distribution function may be adapted to the truncation of the data. This allows very exact calculation of the tolerance band limit values or factors.

A second aspect relates to a method of evaluating a production of products, comprising:

producing a lot of the products, taking a sample group of products from the lot, wherein preferably the size of the sample group is determined by a sample size that is defined in a sampling plan, determining the values of the variable under test for each product of the sample group, wherein the technical variable under test is distributed according to an underlying extreme value distribution function, comparing the determined values with a tolerance interval for the technical variable under test, wherein the tolerance interval is preferably calculable or calculated using the at least one tolerance band limit value obtainable or obtained using the method according to any one of the preceding claims, and optionally deciding whether to accept the lot or to reject the lot based on the results of the comparison.

For the first time a sampling plan for an extreme value distributed variable under test and for a sampling by variable acceptance sampling method is provided. At least one of the tolerance band limit values obtained by a method that is mentioned above may be defined in the sampling plan. Thus, the same technical effects apply also to the method of evaluating the production.

A third aspect relates to a product or to a medical product (100) that is produced in a production process that is evaluated using the at least one tolerance band limit value obtained or obtainable according to any one of the methods mentioned above. Thus, the same technical effects which are mentioned above for the methods apply also to the method of evaluating the production.

A computer program product may comprise computer readable program code with instructions which, when loaded and/or executed on a processor, cause the processor to carry out at least one of, an arbitrarily selected plurality of, or all of the method steps according to any one of the methods mentioned above. The processor may be a standalone processor, preferably a microprocessor or a microcontroller that comprises further units in addition to the processor. On the one hand the program may allow to carry the method for determining a k-factor or k-value. Alternatively or additionally, the program may use a k-factor or a k-value for the evaluation of a production process, whereby the k-factor refers to a variable under test that is distributed according to an extreme value distribution. Furthermore, the k-factor or a k-value may preferably been obtained or may be obtainable according to one of the methods mentioned above. Thus, the features, advantages and technical effects that are valid for the proposed methods and its embodiments may also be valid for the computer program product.

A calculation device may comprise:

a processor configured to execute instructions, a memory that is configured to store the instructions and to store data that is used or generated during the execution of the instructions, a data input device, a data output device, and a computer program product as mentioned above or a computer program product that is configured:

to compare determined values of a technical variable under test for each product of a sample group with a tolerance interval for the technical variable under test, wherein the technical variable under test is distributed according to an underlying extreme value distribution function, and wherein the tolerance interval is preferably calculable or calculated using the at least one tolerance band limit value obtainable or obtained using one of the methods mentioned above.

The input device may receive or may be used to input determined values, for instance using a data file or using a keyboard. The output device may send or may be used to output a result of the comparison, for instance on a monitor or into an output file. Thus, the features, advantages and technical effects that are valid for the proposed methods and its embodiments may also be valid for the calculation device.

An alternative calculation device may comprise:

a processor configured to execute instructions, a memory that is configured to store the instructions and to store data that is used or generated during the execution of the instructions, a data input device, a data output device, and a computer program product that is configured:

to obtain at least one tolerance band limit value from sample tolerance band limit values of a respective sample using a location measure of a distribution according to which the sample tolerance band limit values are distributed, wherein the technical variable under test is distributed according to an underlying extreme value distribution function, wherein each of the sample tolerance band limit values is calculated using a sample-specific conditional probability distribution function which is a function of sample values of the respective sample.

In more detail the computer program may be configured:

to generate at least 10, at least 100 or at least 1000 groups of samples of a same sample size using a sample-specific probability distribution function and using parameters that are characteristic for an industrial production process as well as using a random function in order to consider the fluctuations of the industrial production process, to calculate a respective tolerance band limit value for each of the group of samples using a conditional probability distribution function, wherein the conditional probability distribution function allows to calculate at least one tolerance limit based on determined values of the variable under test of a sample, and wherein the sample-specific conditional probability distribution function is conditional in the sense that the function values of the conditional probability distribution function depend on the determined values of the sample, and to calculate a location measure of a distribution that is represented by the tolerance band limit values.

More specifically the steps a) to e) and/or f) that are mentioned above may be performed by the computer program if its instructions are executed by a processor, for instance by a microprocessor, by a signal processor, by a microcontroller or by another processor.

The data input unit may be a keyboard and/or a data receiving unit that receives data via a data transmission network. The data output unit may be a monitor, a memory and/or a data sending unit that sends or transmits data via a data transmission network, preferably via the same network over which the data receiving unit has received the input data.

Thus, the features, advantages and technical effects that are valid for the proposed methods and its embodiments may also be valid for the calculation device.

The making and using of the presently preferred embodiments are discussed in detail below. It should be appreciated, however, that the present disclosure provides many applicable concepts that can be embodied in a wide variety of specific contexts. The specific embodiments discussed are merely illustrative of specific ways to make and use the disclosed concepts, and do not limit the scope of the claims.

Moreover, same reference numerals refer to same technical features if not stated otherwise. As far as "may" is used in this application it means the possibility of doing so as well as the actual technical implementation. The present concepts of the present disclosure will be described with respect to preferred embodiments below in a more specific context namely the production process of drug delivery devices. The disclosed concepts may also be applied, however, to other situations and/or arrangements as well, for instance to the production process of cars, planes, semiconductor products or of chemical products.

The foregoing has outlined rather broadly the features and technical advantages of embodiments of the present disclosure. Additional features and advantages of embodiments of the present disclosure will be described hereinafter, e.g. of the subject-matter of dependent claims. It should be appreciated by those skilled in the art that the conception and specific embodiments disclosed may be readily utilized as a basis for modifying or designing other structures or processes for realizing concepts which have the same or similar purposes as the concepts specifically discussed herein. It should also be recognized by those skilled in the art that equivalent constructions do not depart from the spirit and scope of the disclosure, such as defined in the appended claims.

BRIEF DESCRIPTION OF THE FIGURES

For a more complete understanding of the presently disclosed concepts and the advantages thereof, reference is now made to the following description in conjunction with the accompanying drawings. The drawings are not drawn to scale. In the drawings the following is shown in.

DETAILED DESCRIPTION

Figure 1:
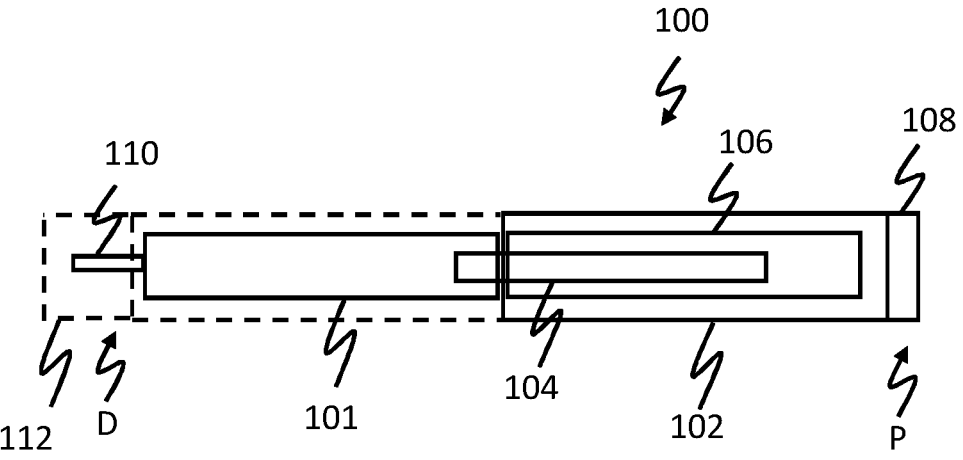
FIG. 1 a drug delivery device.

FIG. 1 illustrates a drug delivery device 100 that may comprise a container retaining member 101. The drug delivery device 100 may comprise a main housing part 102 that encloses or surrounds the container retaining member 101 completely or partially and that comprises further parts of the drug delivery device 100. Alternatively, the main housing part 102 may be connected to the container retaining member 101 but may not surround it and even may not surround a part of the container retaining member 101, see dashed line in FIG. 1.

Within the main housing part 102 the following may be arranged:

a piston rod 104 that is adapted to move a piston of a container that is within container retaining member 301, a driving mechanism 106 for the piston rod 104. The driving mechanism 106 may comprise an energy storing element, for instance a spring, that is loaded manually or automatically, for instance during assembling of drug delivery device 100 or before each use, for instance at an proximal end P, an actuating element 108 that is used for the initiation of a movement of the piston rod 104 into the container retaining member 101, whereby the driving mechanism 106 is used. Alternatively, an autoinjector device may be used that is actuated by an axial movement of a movable needle shield. Optionally, actuation element 106 or another element may be used for dose dialing.

a cap 112 that may be attached to main housing part 102 or to another part of drug delivery device 100. Cap 112 may be an outer cap that may include a smaller inner cap that protects needle 110 directly.

Drug delivery device 100 may be a single use or a multiple use device. Actuating element 108 may be part of a trigger mechanism that is triggered from the distal end, for instance if drug delivery device 100 is an auto injecting device.

The drug may be dispensed out of the container through a needle 110 or through a nozzle that is connectable and/or connected to the distal end D of drug delivery device 100. Needle 110 may be changed before each use or may be used several times.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., from about 18° C. to 28° C. or e.g. about 20° C.), or refrigerated temperatures (e.g., from about 2° C. to about 8° C. or from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition. Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An examples of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present disclosure, which encompass such modifications and any and all equivalents thereof.

Figure 2:
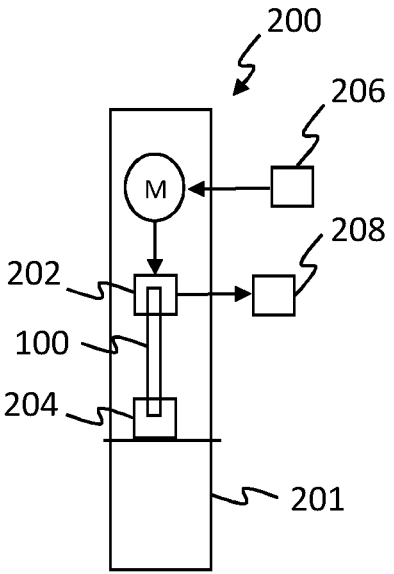
FIG. 2 a test setup device for drug delivery devices.

FIG. 2 illustrates a test setup device 200 for testing at least one parameter of drug delivery devices, especially of drug delivery devices 100. Test setup device 200 may comprise:

a mounting arrangement 201 that allows vertical movement of some parts of test setup device 200, a motor M that generates a torque for the movement of the movable parts, an upper clamp device 202 that may clamp the distal end or the proximal P end of a device under test, a lower clamp device 204 that may clamp the other end of the device under test, a control device 206 that may control the movement that is generated by motor M, and a measurement reporting device 208 that is connected for instance to a force sensor.

Other parts of test setup device 200 are not shown, for instance an optional scale, an electrical power supply unit, etc.

Upper clamp device 202 and/or lower clamping device 204 may be movable relative to each other in order to generate or exert a force that is applied onto the device under test (DUT).

Test setup device 200 may be used to measure forces that are relevant for drug delivery devices 100 or for other devices. In the following, it is assumed that test setup device 200 is used to measure the force of cap attachment of cap 112 or another parameter that is not distributed according to a normal distribution but for instance according to a Gumbel distribution. The drug delivery devices 100 under test may be devices of device type U300max that is produced by the applicant of this application. However, other device types may also be tested.

A completely assembled drug delivery device 100 may be clamped into test setup device 200. Cap 112 may be held by lower clamp device 204. The proximal end P of drug delivery device 100 may be held by upper clamp device 202. However, it is also possible that cap 112 is hold in upper clamp device 204 and that the proximal end of drug delivery device 100 is held in lower clamp device 204.

I. Smallest Extreme Value Distribution $$f_{\sigma,\mu}(x) = \frac{1}{\sigma} \exp\left(\frac{x-\mu}{\sigma}\right) * \exp\left\{-\exp\left(\frac{x-\mu}{\sigma}\right)\right\}, \ (-\infty < x < \infty) \quad \text{(F0)}$$

wherein $\sigma$ is the scale parameter, $\mu$ is the location parameter of the extreme value distribution and x is the variable under test.

Figure 3:
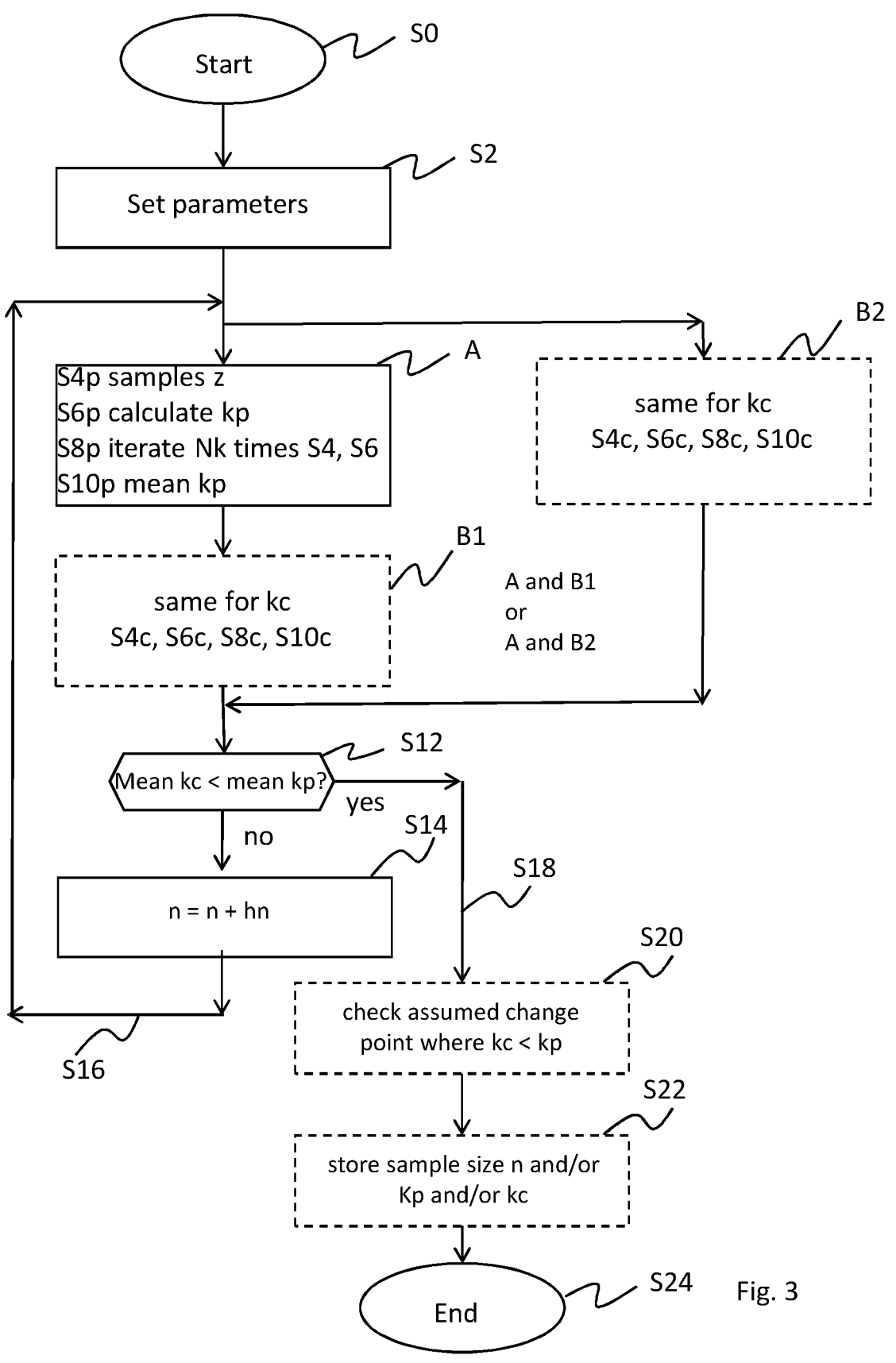
FIG. 3 a method for determining two types of k factors and a sample size n.

FIG. 3 illustrates a method for determining two k factors and/or a sample size n for a variable under test that is based on a smallest extreme value distribution.

The method may only have one phase, e.g. moderate precision of calculation, low precision of calculation or high precision of calculation. In the embodiment of FIG. 3 two phases may be used in order to save calculation costs and/or calculation times in order to reduce the vast computational effort that may be for instance one week using a modern workstation in 2019. However, more than two phases are or only one phase is possible as well. The precision of calculation may be set for instance by:

step width h for integration methods, kind of integration method, e.g. simpler ones as trapezoid rule, Romberg method, or better methods as Runge-Kutta three step, four steps or higher or implicit, selecting other step widths that are mentioned below, for instance for step width hn for increasing the sample size n, and number Nk of k values that are the basis for the calculation of the mean k value. Nk may be in the range of 100 to 10000, preferably in the range of 1000 to 5000.

The step width h may be higher by at least factor 2, 3, 4 or 5 in the high precision phase compared to the step width that is used in the low precision phase. The step width hn may be higher by at least factor 2, 3, 4 or 5 in the high precision phase compared to the step width that is used in the low precision phase.

An optional quick simulation with low precision may be performed to estimate the sample size n where mean $k_c <= $ mean $k_p$ occurs, wherein $k_c$ is the tolerance limit factor which considers the costumer risk and $k_p$ is the tolerance limit factor which considers the producer risk.

An example for a producer risk is:

AQL (Acceptance Quality Limit)—the worst tolerable process fraction nonconforming when an individual lot out of a continuing series of lots is submitted for acceptance sampling, for instance 0.1 percent, i.e. 1 part of 1000 parts. The consumer and supplier should agree to the highest defective rate or defect rate that is acceptable (AQL).

PPa: Minimum probability of acceptance at AQL, for instance 90 percent. Or: rejects parts although parts are good, for instance with 10 percent.

Probability content $pc=1-AQL$ and confidence $1-a=1-PPa$.

An example for a consumer risk is:

RQL (Rejectable Quality Limit)—the level of quality at which a lot is expected to be rejected in an individual lot out of a continuing series of lots, see ISO 3951-1, for instance 1 percent. The consumer and supplier should also agree to the highest defective rate or defect rate that the consumer will tolerate in an individual lot (RQL).

The RQL should be defined less critical than AQL. Otherwise there may occur a contradiction for a given batch to be accepted and to be rejected at the same time. RQL may be for instance 1 percent.

CPa: Maximum probability of acceptance at the RQL, for instance 10 percent. Or: 90% of lots are expected to be rejected although parts are good for instance with 99 percent—what seems to be acceptable for customers.

Probability content $pc=1-RQL$ and confidence $1-\alpha=CPa$.

However, other values are possible as well in both examples.

The following steps may be performed sequentially, e.g. one after the other:

S0) The method may start by starting a program on a computer device.

S2) Parameters are set, for instance one, several or all of:

a reasonable low sample size n1, step width h1 for integration method, type of integration method, number Nk of k values that are the basis for the calculation of the mean k value, confidence levels separately $1-\alpha_p$ and $\alpha_c$, coverage P of tolerance interval TI, or separately $P_p$ and $P_c$, $\lambda_p$ is $\log(-\log(P))$ with P the probability content, $\lambda_p$ may be the same for $k_p$ and $k_c$. Alternatively, there may be used also a $\lambda_c$.

and other parameters that are mentioned below, for instance in steps St1 to St11.

S4) Determine sample values z according to sample size n, i.e. according to n1 first. Use a distribution that is appropriate and parameters of the distribution that are appropriate. The distribution and the parameters may be known for instance from earlier production processes or may be determined in a different way. Furthermore, a random or pseudo-random function may be used to simulate a later production process, i.e. in order to obtain virtual sample values z.

S6) Calculate value of Lawless formula (F11) or of a function G(x; z) using formula (F4) for instance in combination with a determination of a zero point or a unique root as is possible with Minitab 18 program or higher version of Minitab (see for instance https://support.minitab.com/en-us/ minitab/18/help-and-how-to/quality-and-process-improvement/quality-tools/how-to/tolerance-intervals-nonnormal-distribution/methods-and-formulas/tolerance-intervals/).

The zero point or unique root allows the calculation of a k factor depending on sample size and on specific sample group sample values z. A function G(x; z) is calculated as given below, see formula (F4). The calculation of the zero point is mentioned below, see formula (F3). Details of the calculation of formula (F4) are also given below, i.e. steps St1 to St11.

S8) Iterate steps S4 to S8 for different sample groups comprising sample values z Nk times. Stop iteration if number Nk of k values is reached.

Deriving an acceptance sampling plan to meet producer and consumer risk points may suggest to consider $k_c$ (k factor considering customer risk) and $k_p$ (k factor considering producer risk) separately.

In detail, there may be steps S4, S6, S8, S10 for $k_p$, e.g. S4p, S6p, S8p and S10p. These steps may be is comprised in a block A. In steps S4p, S6p, S8p and S10p relevant parameters considering the producer risk are used, for instance $1-\alpha$, $1-\alpha_p$, P, $P_p$, etc.

Furthermore, in detail, there may be the similar steps S4, S6, S8 and S10 for $k_c$, e.g. S4c, S6c, S8c and S10c. This is comprised in blocks B1, B2. In steps S4c, S6c, S8c and S10c relevant parameters considering the consumer risk are used, for instance $\alpha$, $\alpha_c$, $1-P$, $P_c$, etc.

There may be a sequence of calculation, e.g. first block A then block B1, first block B1 then block A, or simultaneously block A and B2, i.e. parallel in time. Mixing modes of calculations in block A and block B1, B2 are also possible, for instance in order to calculate similar term of the equations only once.

Furthermore, only block A or only block B1, B2 may be performed if only one k value $k_c$ or $k_p$ is needed and/or another stop criteria is used in step S12

The same sample values z may be used in block A and in block B within one iteration cycle or loop. Alternatively, two sets of sample values z may be calculated, i.e. zp for the calculation of $k_p$ and zc for the calculation of $k_c$.

S10) calculate or determine mean k factor using the arithmetic mean of the k values calculated during the iteration in step S6, S6p, S6c. Other location measures may be used as well, for instance modus, median, etc. The mean $k_p$ may be calculated using the $k_p$ values. The mean $k_c$ may be calculated using the $k_c$ values.

S12) It is checked whether mean $k_c$ is smaller than mean $k_p$ or whether $k_c$ is smaller than or equal to $k_p$.

S14) If the condition that is checked in S12 is not true, the sample size is increased to n2, e.g. n2=n1+hn, then to n3 etc. However, step width hn may be constant or variable.

S16) Steps S4p, S6p, S8p, S10p and/or S4c, S6c, S8c, S10c are iterated for current sample size n2, n3 etc. This means that the calculations of block A and/or block B1, B2 be are repeated. If n gets greater, i.e. it increases, factor $k_c$ decreases and factor $k_p$ increases each time that step S12 is reached.

S18) Thus, if the condition that is checked in step S12 becomes true, leave the loop that is formed of steps S4 to S16. This means that this loop is left if $k_c$ is for the first time smaller than $k_p$. The results for n, $k_c$ and $k_p$ of last the loop may be used to set the start parameters for the next phase if any. If there is no second phase that calculates with higher precision than the first phase, the results for n, $k_c$ and/or $k_p$ of last the loop may be used for the sampling plan. The values n, $k_c$ and $k_p$ of the sampling plan may be used to monitor the production of devices later, for instance of medical devices, e.g. autoinjectors, multi dose pens, etc.

In the following, it is assumed that in the embodiment there is a second phase that uses higher precision for calculation than is used in the first phase that is mentioned above, i.e. Steps S0 to S18. Alternatively, it is possible to use only one phase.

S20) Check the assumed change point by doing simulation with high precision in order to estimate the sample size n where mean $k_c$<=mean $k_p$ occurs. Checking may be specified in more detail as calculating the exact values that are necessary for regulatory purposes and/or for the sampling plan.

In principle the same steps S2 to S18 as mentioned above may be repeated within the second phase. However, the start value of n may be selected more appropriate using for instance the result value of n of the first phase calculation. The step width hn of increasing n may be more moderately, i.e. smaller, for instance smaller than half, third or fourth compared to hn that is used in the first phase. The integration step width h may also be reduced and may be for instance smaller than half, third or fourth compared to h that is used in the first phase. The other parameters mentioned in step S2 may remain unchanged. More sophisticated integration methods may be used in the second phase compared to the type of integration method that is used in the first phase. A Runge-Kutta method of higher order (3, 4, 5 or higher) may be used. Alternatively, only some of these changes may be made. Nk may be increased by at least factor 2, 3 or 4 compared with Nk in the low precision phase.

S22) The second phase is ended if again $k_c$ is smaller than $k_p$ or $k_c$ is smaller than or equal to $k_p$ for the first time within the second phase. These $k_p$ and/or $k_c$ and the corresponding n for the sample size are the results that may be used for the sample plan and/or for monitoring the production of devices and/or other technical products and/or materials. Both k factors $k_c$ and $k_p$ may be used for establishing a sampling plan or only one of them.

S24) The method ends in step S24.

Figure 4:
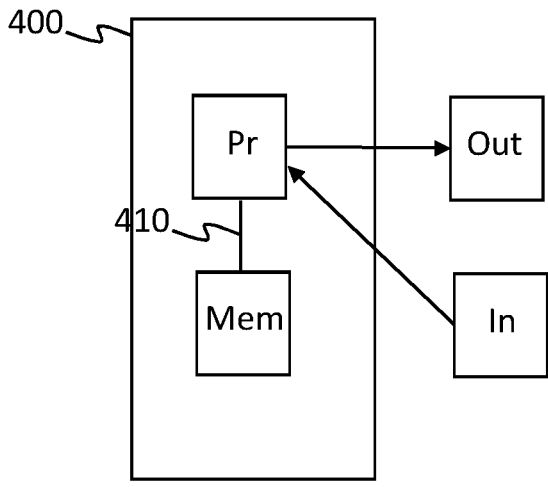
FIG. 4 a calculation device that may perform the method steps.

If all parameters are set, the whole method may be performed without interruption by a machine, e.g. completely automatically. FIG. 4 which is explained in detail below shows one example of such a machine or electronic device.

As mentioned above, the k factor from the sampling plan may be used later in the production:

$$\hat{\xi}+k_c*\hat{\delta}<=USL \tag{FIII}$$

wherein $\hat{\xi}$ is the estimated location parameter of a Gumbel distribution, wherein $\hat{\delta}$ is the estimated scale parameter of a Gumbel distribution, and wherein USL is the upper specification limit.

The left side of formula (FIII) gives the upper tolerance band limit UTBL. In the case of the Gumbel distribution the calculations have to have modified as is mentioned below under III., i.e. sampling data z has to be multiplied by −1.

In case of a lower tolerance band limit LTBL the whole calculation has to be repeated with replacing alpha by (1−alpha) and PC with (1−PC).

Using $k_p$ it is also possible to calculate the relevant USL and LSL considering the producer risk(s).

Back to the embodiment for a smallest extreme value distribution, there is a similar formula (F8) for the USL and $k_2$ that is mentioned below.

The tool Minitab 18 or higher version calculates exact (1−α, P) tolerance intervals based on Lawless 1), 2) and 3), see next paragraph, where 1−α is the confidence level and P is the coverage (the target minimum percentage of population in the interval). Details are explained in the following. However, other commercial and/or open source tools may also be used as well as proprietary tools.

LITERATURE

1) Lawless, J. F. (1975). Construction of tolerance bounds for the extreme-value and the Weibull distribution. Technometrics, 17, No. 2, 255 to 261.
2) Lawless, J. F. (1973). On the estimation of safe life when the underlying life distribution is Weibull. Technometrics, 15, No. 4, 857 to 865.
3) Lawless, J. F. (1972). Confidence intervals for the parameters of the Weibull distribution. Utilitas Mathematica, 2, 71 to 87.
Literature 1) to 3) are incorporated by reference.

Example: Exact One-Sided Smallest Extreme Value Tolerance Limits

This formula may give the lower limit of the tolerance interval TI:

$$L=\hat{\mu}-k_1*\hat{\sigma} \tag{F1}$$

wherein $\hat{\mu}$ is the maximum likelihood estimate of the location parameter of the smallest extreme value distribution, wherein $\hat{\sigma}$ is the maximum likelihood estimate of the scale parameter of the smallest extreme value distribution, and wherein $k_1$ is the tolerance band limit value.

The tolerance band limit value or in short the tolerance limit factor $k_1$ is calculated as follows:

$$k_1=-x \tag{F2}$$

wherein x is the unique root (zero point) of this function and the same as in formula (F0):

$$G(x;z)-1+\alpha \tag{F3}$$

with α as mentioned above and G(x; z) as follows:

$$G(x;z)= \tag{F4}$$

$$C_Z \int_0^{+\infty} \frac{t^{n-2} \exp\left((t-1)*\sum_{i=1}^{n} z_i\right)*IG_n\left[\exp\left(\lambda_p - xt\right)*\sum_{i=1}^{n}\exp\left(z_i t\right)\right]}{\left[\frac{1}{n}\sum_{i=1}^{n}\exp\left(z_i t\right)\right]^n} dt$$

wherein $C_z$ is a normalization constant, see formula (F6) below, t is the integration variable, ($z_2$ in Lawless 1) document, see above), n is the number of observations in the sample, i.e. the sample size, exp is the exponential function, i is a counting variable, $z_i$ are the $$\frac{x_i - \hat{\mu}}{\hat{\sigma}}$$

centered observations based on the MLE (Maximum Likelihood Estimation) estimates of the location and scale parameters of the smallest extreme value distribution, e.g. the determined sample values z, $IG_n$ is the function of formula (F7) below, and $\lambda_p$ is log(−log(P)) with P the probability content.

The numerical integration of formula (F4) can be done for instance by using a Runge-Kutta-method or a simpler integration method as mentioned above, i.e. trapezoid method or improved trapezoid method (Romberg method), or another appropriate method.

The following steps may be used in a very simple example:

St1) determine number n of observed samples zi, see steps S2 and S14 mentioned above, St2) determine values of $z_i$ for group of n observed samples $z_i$, see step S4 above, St3) calculate constant $C_z$, see formula (F6) below, St 4) select dt step width, i.e. same as step width h, may be constant or variable depending on integration method and/or on calculation mode, for instance low precision or high precision, St5) select first x value, for instance smallest expected or smallest appropriate negative value or positive value, St6) for each interval of integration from 0 to sufficiently big number (approximation for plus infinity) perform one integration step according to the selected integration rule. In the simplest case calculate for instance fraction, i.e. enumerator (above fraction bar) and denominator (below fraction bar), consider step width dt, for instance multiply by step width:

for enumerator calculate the following product:

$t^{n-1}*\exp((t-1)*$sum over $z_i*IG_n[\exp(\lambda_p-xt)*\Sigma_{i=1}{}^n\exp(z_it)]$ wherein $IG_n[\ ]$ is calculated according formula (F7) by performing a further integration method.

for denominator calculate sum or use sum that is last part of enumerator, i.e. $\Sigma_{i=1}{}^n\exp(z_it)$, St7) sum up these values calculated in St6) for each interval, St8) multiply sum by constant $C_z$ and save value of G(x; z) according to formula (F3) for further calculations, for instance of zero point (unique root), see formula (F3) above, St9) select next x value for instance with xnew=xold+step width dx, St10) check if last x value is reached, if not repeat calculation for next x value xnew, i.e. go to St6)

St11) if last x value is reached, stop because appropriate interval of x has been calculated.

Now it is possible to determine zero point of the function mentioned in formula (F3) above, using for instance a spline approximation and/or appropriate method for determining zero point (for instance newton method). Alternatively, it is possible to search for a value of the function according to formula (F3) that has minimum distance to zero, for instance using the absolute value function.

For the calculation of the function $IG_n[\ ]$ $\lambda_p$ should be calculated once according to:

$$\lambda_P=\ln(-\ln(P)) \tag{F5}$$

wherein P is the coverage of the tolerance interval. If $k_p$ is calculated P is used here. If $k_c$ is calculated use 1−P or other value.

$C_z$ is a normalizing constant and may be calculated as follows:

$$C_Z^{-1} = \int_0^{+\infty} \frac{t^{n-2}\exp\left((t-1)*\sum_{i=1}^n z_i\right)}{\left[\frac{1}{n}\sum_{i=1}^n \exp(z_it)\right]^n} dt \tag{F6}$$

The function $IG_n[y]$ is the incomplete gamma function:

$$IG_n[y] = \int_0^y \frac{t^{n-2}*\exp(-t)}{\Gamma[n]} dt \tag{F7}$$

wherein Γ[n] is the Gamma funktion, i.e. Γ[n+1]=n!, i.e faculty of n for integers.

This formula gives the upper limit:

$$U=\hat{\mu}+k_2*\hat{\sigma} \tag{F8}$$

The value of $k_2$ comes from replacing a with 1−α and P with 1−P in the formulas (F1) to (F8) for computing $k_1$. The value of $k_1$ stands for the calculation of a lower limit and $k_2$ stands for the calculation of an upper limit according to the Minitab Help Page.

In case of a lower limit:

$k_P$ is calculated according to the formula for $k_1$.

Values for 1−α and P are set as follows:

1−α is set to 1−PPa, and

P is set to 1−AQL.

$k_C$ is calculated according to the formula for $k_1$.

Values for 1−α and P are set as follows:

1−α is set to CPa, and

P is set to 1−RQL.

In case of an upper limit (e.g. upper limit for a dispense force of a pen device):

$k_P$ and $k_C$ are calculated according to the formula for $k_2$.

I.e. α is replaced with α with 1−α and P with 1−P in the formulas (F1) to (F8).

formula (F3) changes to G(x; z−α), and in formula (F4) we have $\lambda_{1-P}$ instead of $\lambda_P$, and formula (F5) changes to $\lambda_{1-P}=\ln(-\ln(1-P))$.

For $k_P$ values for 1−α and P are set as follows:

1−α is set to 1−PPa, and

P is set to 1-AQL.

For $k_C$ values for 1−α and P are set as follows:

1−α is set to CPa, and

P is set to 1−RQL.

Example: Approximate Two-Sided Smallest Extreme Value Tolerance Intervals

Replace α by α/2 and P by (P+1)/2 in the formulas for computing the one-sided tolerance limits in order to calculate the approximate two-sided interval.

II. Weibull Distribution $$f_{\beta,\sigma}(X) = \frac{\beta}{\delta}\left(\frac{x}{\delta}\right)^{\beta-1}*e^{-\left(\frac{x}{\delta}\right)^\beta} \tag{F9}$$

wherein β is the form parameter or the Weibull module and δ=1/λ is the scale parameter and x is the variable under test.

The tolerance interval for the Weibull distribution uses the same equations (F1) to (F8) as tolerance intervals for the smallest extreme value distribution. The calculations follow this process:

1. take the natural logarithm of the data,
2. calculate a tolerance interval for the transformed data using the tolerance interval procedure for the smallest extreme value distribution,
3. exponentiate the limits of the tolerance interval obtained in the previous step to transform the interval to the scale of the original data.

Formulas (F1) to (F8) that apply to the smallest extreme value distribution do also apply to Weibull distribution considering these modifications.

III. Gumbel Distribution or Largest Extreme Value Distribution $$f_{\sigma,\mu}(x) = \frac{1}{\sigma} \exp\left(-\frac{x-\mu}{\sigma}\right) * \exp\left\{-\exp\left(-\frac{x-\mu}{\sigma}\right)\right\}, \ (-\infty < x < \infty) \quad \text{(F10)}$$

wherein $\sigma$ is the form parameter is the scale parameter, $\mu$ is the location parameter and x is the variable under test.

The tolerance interval for the Gumbel respective the largest extreme value distribution uses the same equations (F1) to (F8) as tolerance intervals for the smallest extreme value distribution. The calculations follow this process:

1. multiply the data by −1,
2. calculate a tolerance for the transformed data using the tolerance interval procedure for the smallest extreme value distribution,
3. exponentiate the limits of the tolerance interval obtained in the previous step to transform the interval to the scale of the original data.

Formulas (F1) to (F8) that apply to the smallest extreme value distribution do also apply to Gumbel distribution/largest extreme value distribution considering these modifications.

FIG. 4 illustrates a calculation device 400 that may perform the method steps which are shown in FIG. 3. Calculating device 400 may comprise:

a processor (Pr) configured to execute instructions, especially for performing the disclosed calculations,
a memory (Mem) that is configured to store the instructions and to store data that is used or generated during the execution of the instructions,
an optional input device (In), for instance a keyboard or a data receiving unit (e.g. via internet or intranet), that is configured to input data that will be stored in the memory (Mem), especially to enter the sample values z,
an optional output device (Out), for instance a display device or a data sending unit (e.g. via internet or intranet), that is configured to output data that is generated during the execution of the instructions, especially the obtained k factor(s) and/or the sample size n, and
a computer program product that calculates kc and/or kp and/or sampling size n for a sampling plan that is used for the production of products, especially pharmaceutical products and/or medical products and/or medical devices.

There may be a connection/bus 410 between processor Pr and memory Mem. Further units of calculation unit 400 are not shown but are known to the person skilled in the art, for instance a power supply unit, an optional internet connection, etc. Alternatively, a server solution may be used that uses calculation power and/or memory space available on the internet supplied by other service providers or on an intranet of a company.

A corresponding calculation device may be used to perform the acceptance sampling for extreme value distributed data during the production of products, especially of medical products or of medical devices. Such calculation devices are mentioned in the first part of the description.

Spoken with other words and in addition to the description of FIGS. 1 to 4 above, the following may be considered:

A) Acceptance Sampling for Extreme Value Distributed Data Acceptance Sampling is Based on 4 Parameters Producers Risk→1. Acceptable Quality Limit (AQL), 2. Confidence Consumers Risk→3. Reject Quality Limit (RQL), 4. Confidence Provided these 4 parameters a sampling plan can be derived Attributive sampling→test sample size (n) and Accept/Reject numbers (Re/Ac)→ISO 2859-1

(currently used at SFD (Sanofi Devices) for Batch Release)

Sampling by Variables→test sample size (n) and k-factor (k)→ISO 3591-1 (reduced sample size possible, but normal distribution required)

ISO 3951-1 provides pre-defined sampling plans for Normal Distribution

Individual sampling plans can be derived mathematically for Normal Distribution [1] A. Kiermeier: "Visualising and Assessing Acceptance Sampling Plans: The R Package Acceptance Sampling" (2008)

Issue: Some parameters in Device Statistics are not normally distributed

In particular: Dispense Force is Gumbel distributed (due to Fisher-Tippet-Gnedenko Theorem)

B) Sampling by Variables for Gumbel Distribution

Define sample sizes and acceptance criteria to satisfy producer and consumer risk Producer Risk AQL: Acceptance quality limit $PP_a$: Minimum probability of acceptance at the AQL Consumer Risk RQL: Rejectable quality limit $CP_a$: Maximum probability of acceptance at the RQL Mathematical Formulation:

Confidence limits for distribution quantiles need to be calculated (known as tolerance intervals)

Producer risk: $PP_a$-confidence limit of the AQL-quantile

Consumer risk: $CP_a$-confidence limit of the RQL-quantile

In case of Gumbel distribution these limits can be calculated as $\hat{\xi}+k\cdot\hat{\delta}$, where $\hat{\xi}$ is the estimated location parameter and scale $\hat{\delta}$ the estimated scale parameter For producer risk $k_P$ depends (amongst others) on $PP_a$, AQL, and sample size n For consumer risk $k_C$ depends (amongst others) on $CP_a$, RQL, and sample size n Looking for a sample size n, such that $k_C \leq k_P$ (can be mathematically derived)

25            26

C) Approach

Criterion to be fulfilled for batch release:

$\xi + k \cdot \hat{\delta} \leq$ USL, in case of an upper specification limit

Acc. to Lawless exact tolerance bounds can be computed via $$Pr(Z_\gamma \geq z \mid a) = (r-1)! k_r(a) * \qquad (F11)$$

$$\int_0^{+\infty} \frac{G_r\left\{\exp(\alpha - tz)\left[\sum_{i=1}^r \exp(a_i t) + (n-r)\exp(\alpha_r t)\right]\right\}}{\left(\left\{\sum_{i=1}^r \exp(a_i t) + (n-r)\exp(\alpha_r t)\right\}^n\right)} dt$$

$$t^{r-2}\exp\left(t * \sum_{i=1}^r a_i\right) *$$

wherein formula (F11) is essentially the same as formula (F4), if the corresponding letters are used, for instance n for r, z for a, $\lambda_p$ for $\alpha$, etc. Formula (F11) is based on formula (F0) but $\mu$ is replaced by u and $\sigma$ is replaced by b. Furthermore, some other intermediate steps are performed as is shown in Lawless 1), 2) and 3) as cited above.

Thus k depends on the observed samples a according to formula (F11) or z according to formula (F4).

But for batch release pre-defined sampling plans are required!

D) k-Value Distribution for Selected Location and Scale Parameters

Figures 5, 6:
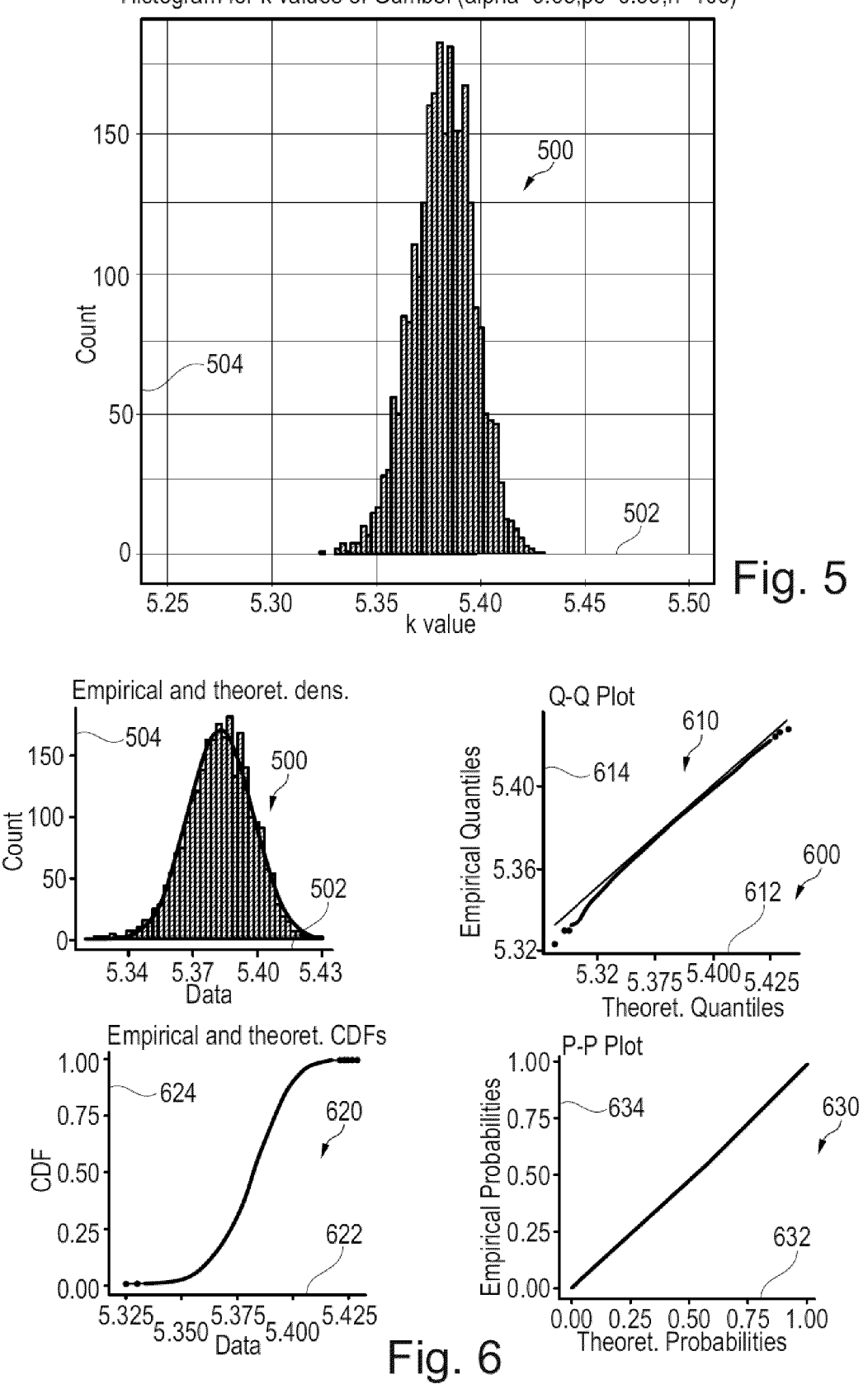
FIG. 5 a histogram for k values of a Gumbel distributed variable under test, and FIG. 6 a Q-Q Plot and a P-P Plot showing close fitting between empirical and theoretical density (pdf) and cumulative distribution function (CDF).

FIG. 5 illustrates a histogram for k values of a Gumbel distributed variable under test. The empirical and theoretical density 500 is shown in a Cartesian coordinate system having an x-axis 502 showing the data values for the mean k factors, for instance $k_p$ or $k_c$ with alpha or $\alpha=0.05$, pc=0.99 and n=100 and a y-axis 504 showing the count, i.e. how often the respective k factor value was calculated during the calculation of 2500 k factors of the example.

FIG. 6 illustrates a Q-Q Plot and a P-P Plot showing close fitting between empirical and theoretical density (pdf) and cumulative distribution function (CDF). In more detail four coordinate systems 600 are shown:

the empirical and theoretical density 500, a corresponding Q-Q plot 610 (quantile-quantile-diagram) having an x-axis 612 showing the theoretical quantities and a y-axis 614 showing the empirical quantities, corresponding empirical and theoretical CDFs 620 having an x-axis 622 showing data values and a y-axis 624 showing the CDF, and a corresponding P-P-plot 630, (probability-probability plot) having an x-axis 632 showing theoretical probabilities and a y-axis 634 showing empirical probabilities.

2500 (maybe increased or maybe decreased) k-values have been calculated exemplarily with $\alpha=0.05$, $pc=0.99$, $n=100$ Location parameters: seq(0, 2, 0.5), i.e. sequence or interval from 0 to 2 with step width 0.5, Scale parameters: seq(1, 3, 0.5) i.e. sequence or interval from 1 to 3 with step width 0.5.

Results:

There is no correlation between k and location/scale k-values have some random variation depending on the samples ~approximately normal distributed Hypothesis:

It exists a "true" k-value correctly reflecting the tolerance bounds

E) Identification of "True" k-Value (1. Mean Approach, Alternatively Median May be Used or Other Statistical Location Measure)

Mean of the 2500 simulated values $k_{true}=5.382$

Simulation 100,000 random samples of size n=100 with true 0.99-quantile $q_{99}$ Upper tolerance bound calculates as U=loc+$k_{true}$·scale Acceptance criterion: U$\leq q_{99}$ Expectation: 5% Acceptances, 95% Rejections (as $\alpha=0.05$)

Result: 4955 Acceptances, 95045 Rejections

5% quantile of upper tolerance bounds: $4 \cdot 10^{-4}$

For comparison: Standard Lawless approach leads to relative error of $5.5 \cdot 10^{-4}$ (with simulation size of n=2500)

Conclusion: Mean approach gives a good precision! (no loss compared to Lawless approach)

F)

Novelty:

No publication found for pre-defined Acceptance Sampling Plans for Gumbel distributed data Special Step:

Compute k-values as mean of a big number of simulations of Lawless approach to enable pre-defined sampling plans Business Case Saving test samples and testing effort compared to attributive sampling Although embodiments of the present disclosure and their advantages have been described in detail, it should be understood that various changes, substitutions and alterations can be made therein without departing from the spirit and scope of the disclosure as defined by the appended claims. For example, it will be readily understood by those skilled in the art that many of the features, functions, processes and methods described herein may be varied while remaining within the scope of the present disclosure. Moreover, the scope of the present application is not intended to be limited to the particular embodiments of the system, process, manufacture, method or steps described in the present disclosure. As one of ordinary skill in the art will readily appreciate from the disclosure of the present disclosure, systems, processes, manufacture, methods or steps presently existing or to be developed later that perform substantially the same function or achieve substantially the same result as the corresponding embodiments described herein may be utilized according to the present disclosure. Accordingly, the appended claims are intended to include within their scope such systems, processes, methods or steps. Further, it is possible to combine embodiments mentioned in the first part of the description with examples of the second part of the description which relates to FIGS. 1 to 6.

The invention claimed is:

1. A method executable by a computing system, the method comprising:

calculating by a processor a plurality of sample tolerance band limit values using a sample-specific conditional probability distribution function which is a function of sample values of a sample;

obtaining by the processor at least one tolerance band limit value from the sample tolerance band limit values of different samples, wherein the samples comprise values of a technical variable under test of the associated sample, wherein the at least one tolerance band limit value is obtained using a location measure of a distribution according to which the sample tolerance band limit values are distributed, wherein the technical variable under test is distributed according to an underlying extreme value distribution function, wherein the technical variable relates to a physical characteristic of a product that is producible in an industrial mass production process, and using the at least one tolerance band limit value to calculate at least one of an upper specification level or a lower specification level for monitoring the industrial mass production process;

wherein a) the product is an autoinjector for automatic drug injection comprising a spring member that generates an injection force and wherein the variable under test is a cap removal force of a cap of the autoinjector, a cap placement force of the cap of the autoinjector, or a breakage force of the autoinjector, or wherein b) the product is a multi dose pen injection device and wherein the variable under test is a dial torque for dialing the dose of the multi dose pen, a cap removal force of a cap of the multi dose pen, a cap placement force of the cap of the multi dose pen, or a breakage force of the multi dose pen;

the method further comprising:

testing whether a chosen sample size of the samples is great enough using the location measure of the tolerance band limit values, and if the chosen sample size is not great enough, increasing the chosen sample size and generating new samples that have an increased sample size and performing the obtaining step again, or if the chosen sample size is great enough, using the chosen sample size for defining a sampling plan or using the chosen sample size to calculate an improved value of the sample size for a sampling plan;

wherein the method further comprises:

producing a lot of the products;

taking a sample group of products from the lot according to the sample size specified in the sampling plan;

determining the values of the variable under test for each product of the sample group;

comparing the values with a tolerance interval that is calculated using the tolerance band limit value according to the sampling plan; and deciding whether to accept the lot or to reject the lot based on results of the comparison.

2. The method according to claim 1, wherein the at least one tolerance band limit value is a tolerance band limit value that considers risks of at least one producer of the products, or wherein the at least one tolerance band limit value is a tolerance band limit value that considers risks of the consumers of the products, or wherein the at least one tolerance band limit value comprises both of these tolerance band limit values.

3. The method according to claim 2, further comprising:

calculating a first location measure for a first distribution that is represented by first sample tolerance band limit values which consider the risks of at least one producer; and calculating a second location measure for a second distribution that is represented by second sample tolerance band limit values which consider the risks of the consumers.

4. The method according to claim 3, further comprising:

testing whether the second location measure is smaller than the first location measure; and if the second location measure is not smaller than the first location measure, increasing the chosen sample size and generating new samples that have an increased sample size and performing the obtaining step again, or if the second location measure is smaller than the first location measure, using the chosen sample size for defining a sampling plan or using the chosen sample size to calculate an improved value of the sample size for a sampling plan.

5. The method according to claim 1, wherein the sample-specific conditional probability distribution function is calculated according to the following formula:

$$G(x, z) =$$

$$C_Z \int_0^{+\infty} \frac{t^{n-2} \exp\llbracket ((t-1) * \rrbracket \sum_{i=1}^n * IG_n \left[ \exp(\lambda_p - xt) * \sum_{i=1}^n \exp(z_i t) \right]}{\left[ \frac{1}{n} \sum_{i=1}^n \exp(z_i t) \right]^n}$$

wherein $C_z$ is a normalization constant, t is an integration variable, n is the number of observations in the sample, i.e. the sample size, exp is the exponential function, i is a counting variable, $z_i$ are the determined values (z) of the variable (x) under test, $IG_n$ is the function $$IG_n[y] = \int_0^y \frac{t^{n-2} * \exp(-t)}{\Gamma[n]} dt,$$

and $\lambda_p$ is $\log(-\log(P))$ with P the probability content.

6. The method according to claim 1, further comprising:

performing the obtaining step in a first phase with a calculation of a first precision; and performing the obtaining step in a second phase with a calculation of a second precision that is higher than the first precision.

7. The method according to claim 1, wherein the method is performed for uncensored data.

8. The method according to claim 1, wherein the method is performed for truncated data.

9. A method of evaluating a production of products, the method comprising:

calculating by a processor a plurality of sample tolerance band limit values using a sample-specific conditional probability distribution function which is a function of sample values of a sample, obtaining by the processor at least one tolerance band limit value from sample tolerance band limit values of different samples, wherein the samples comprise values of a technical variable under test of the associated sample, wherein the at least one tolerance band limit value is obtained using a location measure of a distribution according to which the sample tolerance band limit values are distributed, wherein the technical variable under test is distributed according to an underlying extreme value distribution function, wherein the technical variable relates to a physical characteristic of a product that is producible in an industrial mass production process;

the method further comprising:

testing whether a chosen sample size of the samples is great enough using the location measure of the tolerance band limit values, and if the chosen sample size is not great enough, increasing the chosen sample size and generating new samples that have an increased sample size and performing the obtaining step again, or if the chosen sample size is great enough, using the chosen sample size for defining a sampling plan or using the chosen sample size to calculate an improved value of the sample size for a sampling plan;

producing a lot of the products;

taking a sample group of products from the lot according to the sample size specified in the sampling plan;

determining values of the technical variable under test for each product of the sample group;

comparing the values with a tolerance interval for the technical variable under test, wherein the tolerance interval is calculated using the at least one tolerance band limit value; and deciding whether to accept the lot or to reject the lot based on results of the comparison;

wherein a) the product is an autoinjector for automatic drug injection comprising a spring member that generates an injection force and wherein the variable under test is a cap removal force of a cap of the autoinjector, a cap placement force of the cap of the autoinjector, or a breakage force of the autoinjector, or wherein b) the product is a multi dose pen injection device and wherein the variable under test is a dial torque for dialing the dose of the multi dose pen, a cap removal force of a cap of the multi dose pen, a cap placement force of the cap of the multi dose pen, or a breakage force of the multi dose pen.

10. The method according to claim 9, wherein the at least one tolerance band limit value is a tolerance band limit value that considers risks of at least one producer of the products, or wherein the at least one tolerance band limit value is a tolerance band limit value that considers risks of the consumers of the products, or wherein the at least one tolerance band limit value comprises both of these tolerance band limit values.

11. The method according to claim 10, further comprising:

calculating a first location measure for a first distribution that is represented by first sample tolerance band limit values which consider the risks of at least one producer; and calculating a second location measure for a second distribution that is represented by second sample tolerance band limit values which consider the risks of the consumers.

12. The method according to claim 11, further comprising:

testing whether the second location measure is smaller than the first location measure; and if the second location measure is not smaller than the first location measure, increasing the chosen sample size and generating new samples that have an increased sample size and performing the obtaining step again, or if the second location measure is smaller than the first location measure, using the chosen sample size for defining a sampling plan or using the chosen sample size to calculate an improved value of the sample size for a sampling plan.

13. The method according to claim 1, wherein the product comprises:

a housing part, a piston rod arranged in the housing part, a driving mechanism for the piston rod, and a cap attached to the housing part or configured to be attached to the housing part.

14. The method according to claim 1, wherein deciding is made automatically by a computing machine.

15. The method according to claim 1, wherein a test device is used for determining the values of the variable under test, wherein the test device comprises:

a mounting arrangement that allows movement of movable parts of the test device, a motor that generates torque for the movement of the movable parts, at least one clamp device to clamp the respective product of the sample group, a control device which controls the movement that is generated by the motor, a force sensor, and a measurement reporting device that is connected to the force sensor.

* * * * *